United States Patent
Chakra et al.

(10) Patent No.: US 7,979,902 B2
(45) Date of Patent: Jul. 12, 2011

(54) USING OBJECT BASED SECURITY FOR CONTROLLING OBJECT SPECIFIC ACTIONS ON A SURFACE BASED COMPUTING DEVICE

(75) Inventors: Al Chakra, Apex, NC (US); Monica S. Harris, Wake Forrest, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 11/939,065

(22) Filed: Nov. 13, 2007

(65) Prior Publication Data

US 2009/0126010 A1     May 14, 2009

(51) Int. Cl.
*G06F 7/04* (2006.01)
(52) U.S. Cl. ........................................................ 726/17
(58) Field of Classification Search ...................... 726/17
See application file for complete search history.

(56) References Cited

U.S. PATENT DOCUMENTS

| 5,127,099 | A | * | 6/1992 | Zifferer et al. | 340/5.22 |
| 5,724,575 | A | | 3/1998 | Hoover et al. | |
| 6,344,794 | B1 | | 2/2002 | Ulrich et al. | |
| 6,367,020 | B1 | * | 4/2002 | Klein | 726/26 |
| 6,397,191 | B1 | | 5/2002 | Notani et al. | |
| 6,651,050 | B2 | | 11/2003 | Shafrir et al. | |
| 6,912,561 | B1 | | 6/2005 | Baer et al. | |
| 7,570,163 | B2 | * | 8/2009 | Ruetschi et al. | 340/572.1 |
| 2006/0288233 | A1 | * | 12/2006 | Kozlay | 713/186 |

* cited by examiner

*Primary Examiner* — Kambiz Zand
*Assistant Examiner* — Teshome Hailu
(74) *Attorney, Agent, or Firm* — Patents on Demand, P.A.; Brian K. Buchheit; Scott M. Garrett

(57) ABSTRACT

The present invention discloses a solution for object level security on a surface based computing device that includes software objects and behavior tokens. The behavior tokens can control an extent that users are able to manipulate the software objects using the surface based computing device. Different levels of control can be established on an object-by-object basis for different users. The extent users are able to manipulate the software objects can also depends upon set of users proximate to the surface based computing device.

20 Claims, 4 Drawing Sheets

USING OBJECT BASED SECURITY FOR CONTROLLING OBJECT SPECIFIC ACTIONS ON A SURFACE BASED COMPUTING DEVICE

BACKGROUND

1. Field of the Invention

The present invention relates to the field of surface based computing and, more particularly, to using object based security for controlling object specific actions on a surface based computing device.

2. Description of the Related Art

Surface based computing devices are a type of computing device in which a display is laid flat to simulate a table top. Surface based computing devices employ the use of a multi-touch sensitive display to interact with the user. Service based computers can include a separation of hierarchy objects, such as digitally encoded photographs, from the file directory that contains them, such as the directory in the surface based computing device. This separation creates a heretofore unresolved challenge of disallowing others sitting at a surface based computing device from manipulating objects should the owner not want such objects to be manipulated. For example, a user who is not an object owner could inadvertently (or intentionally) delete an important object from the surface based computing device to the chagrin of the object owner.

A surface based computing device is illustrated in FIG. 1 (Prior Art), which shows display surface 105, computing device 110, display projector 115, and infrared projectors 120. Processing unit 110 can contain one or more central processing units able to perform computing actions for the surface based device 100. The processing unit 110 can include many of the same components found in everyday desktop computers, such a CPU, a motherboard, RAM, a graphics card, a WIFI transceiver, a BLUETOOTH transceiver, and the like.

The display surface 105 can be a horizontal surface that can incorporate multi-touch sensors. The touch-sensitive display can recognize objects by their shapes or by scanning tags (e.g., RFID tags) embedded in objects resting on the surface of display surface 105. The multi-touch display surface 105 can be capable of processing multiple inputs from multiple users.

Infrared projectors 120 can project infrared light onto display surface 105 to be used for multiple touch sensing by processing unit 110. A "machine vision" of the surface based computing device 100 can operate in a near-infrared spectrum, such as by using an 850 nanometer-Wavelength LED light source aimed at the display surface 105. When objects touch the tabletop, the light reflects back and is picked up by multiple infrared cameras with an acceptable net resolution.

The display projector 115 can used rear-projection technologies, such as Digital light Processing (DLP) technologies, to project visible images to the display surface 105. A resolution of the visible screen can be different from the machine vision or invisible screen. For example, the visible screen can have a resolution of 1024×768, while the invisible resolution from the projectors 120 can be 1280×960, which can allow for better recognition at the edges of the display.

Because of the nature of a surface based computing device's display, multiple users can interact with a computing session at once. Users can gather around the surface based computing device's display and interact through its multi-touch interface. In some cases, a user can be interacting with sensitive material in which should be locked from use by other users, yet with cannot be secured due to the previously mentioned separation of a directory structure from a hierarchy of objects.

To elaborate using a sample scenario, Bill and John can be sales representatives meeting some clients in a hotel lobby that has an accessible surface based computing device. Bill and John can sit down and authenticate at the Surface (e.g., device 110) as presenters and owners of shared session software objects. Their customers can thereafter joint them and authenticate themselves as recipients or consumers of Bill and John's shared software objects, which are incorporated within a sales presentation.

Bill can convey images from his digital camera to the surface based computing device, which contain images of his company's factory. Bill can want to show the images upon the Surface, which are taken a reasonable distance of important machinery, but may not want customers to be able to zoom so that machine model numbers are revealed. Additional image details can exist, which should only be viewable at a lower resolution than available and/or that are not to be zoomed to a low level. Bill may want himself and his colleague, John, to be able to view, change permissions on the images as this information may be selectively important during a specific presentation but should not be exposed without due consideration of the risks involved. Further, Bill and John may wish the customers to be able to manipulate the images to some limited extent. Further, it may be desirable to impose restrictions for images on an image-by-image basis, so that some images can be freely manipulated and not others.

Additionally, the information conveyed during the Surface assisted meeting can be intended for Bill, John, and the customers only. They many not want other potential users or bystanders to have any access to the session software objects. Bill and John can desire to effect special information protecting behavior when unauthorized users approach the Surface, such as freezing or hiding software objects, changing content, and/or removing software objects from the Surface so that the objects only reside on the camera. The level of control desired by Bill and John for software objects is not existent in the current art of surface based computing. A solution is needed to control behavior of software objects on a per-object basis when using a surface based computing device, especially in the case when a non-authorized user approaches the Surface.

SUMMARY OF THE INVENTION

The present invention provides a solution for using object-based security for controlling actions on a surface based computing device. The different controlled actions can vary by a user accessing the software object and can vary based upon a presence or lack of presence of a set of users about a surface based computing device. In one embodiment, behavior tokens can be associated with software objects and can provide details necessary for asserting a fine-grained control over the usage of software objects in a surface based computing context.

The present invention can be implemented in accordance with numerous aspects consistent with the materials presented herein. One aspect of the present invention can include a method for controlling behavior of software objects used on a surface based computing device. In the method, software objects can be associated with behavior tokens, which control an extent that users are able to manipulate said software objects using a surface based computing device. Different manipulations can be based upon a set of users proximate to the surface based computing device. A presence of at least one proximate user can be automatically detected. An identity and/or a privilege group can then be determined for the proximate user, which is used when evaluating an extent that the software objects are able to be manipulated. An attempt to perform an operation against one of the software objects using the surface based computing device can be received. A set of manipulation rights for the software object can be ascertained based upon details specified within a behavioral token associated with the software object and based upon a set of users proximate to the surface based computing device. The manipulation rights can be applied to the surface based computing device. Execution of operations associated with the received attempt can be selectively permitted in accordance with the applied rights.

Another aspect of the present invention can include a method for controlling software object behavior on a surface based computing device. The method can include a step of detecting a set of users proximate to surface based computing device. Privileges that the set of users have for using software objects via the surface based computing device can be determined. Usages rules for the software objects can be dynamically adjusted in accordance with the determined privileges. The usage rules can vary as the set of users proximate to the device changes.

Still another aspect of the present invention can include a system for object level security on a surface based computing device that includes software objects and behavior tokens. The behavior tokens can control an extent that users are able to manipulate the software objects using the surface based computing device. Different levels of control can be established on an object-by-object basis for different users. The extent users are able to manipulate the software objects can also depends upon set of users proximate to the surface based computing device.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
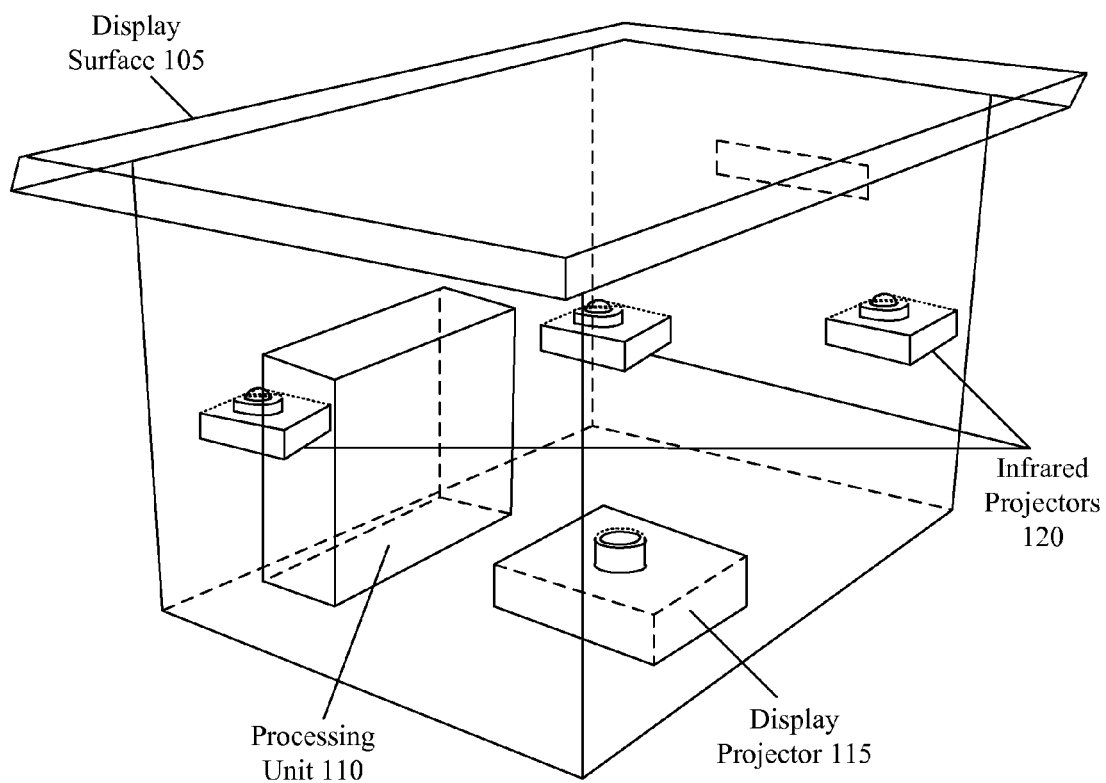
FIG. 1 (Prior Art) shows a surface based computing device.
Figure 2:
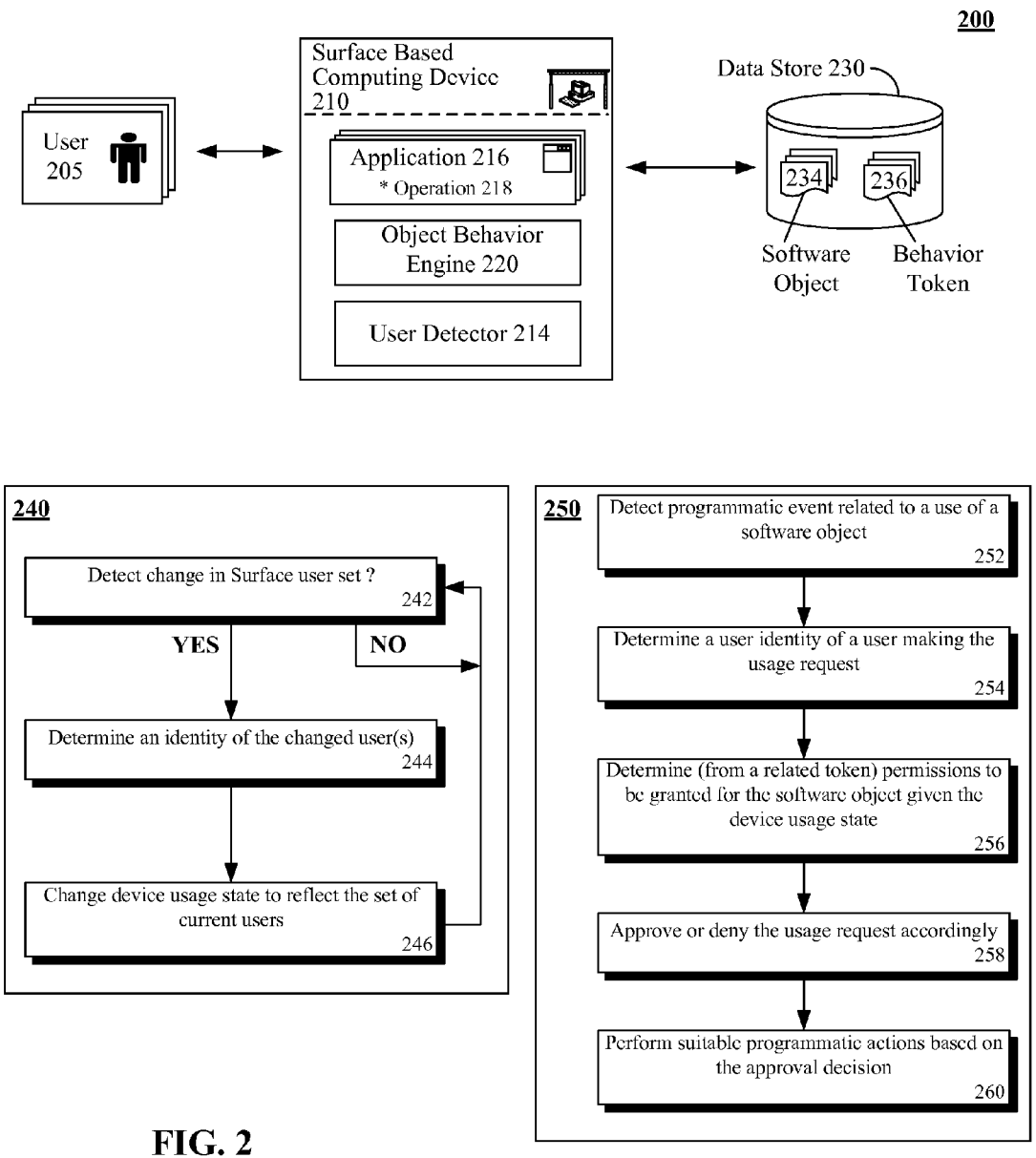
FIG. 2 is a schematic diagram of a system for providing software object-level behavioral control on a surface based computing device that can vary based upon a set of users proximate to the surface based computing device.

FIG. 2 is a schematic diagram of a system 200 for providing software object-level behavioral control on a surface based computing device 210 that can vary based upon a set of users 205 proximate to the surface based computing device 210. A surface based computing device 210 can employ the use of a multi-touch sensitive display to interact with one or more users 205. Interactions can occur through an approximately horizontal computing surface, which is able to function as a table or similar surface. System 100 shows an example of one contemplated surface based computing device 210.

The device 210 can execute a set of applications 216, which perform computing operations 218 involving software objects 234. These software objects 234 can be stored in a data store 230 accessible by the computing device 210. Permitted software object 234 behavior can be defined on a per-object basis using behavior tokens 236. For example, the behavior tokens 236 can specify a set of operations 218, which are allowed to be performed against one or more software objects 234 associated with the token 236, can impose restrictions on these operations 218, and can define conditions that change the permitted operations 218.

Controllable object behavior can include whether an object 234 can be read, copied, deleted, or edited. Behavior can also be operation 218 specific. Behavioral restrictions can, for example, impose a limit on an amount of zoom permitted or on a viewing resolution permitted against an image (one type of software object 234). Different types of software objects 234 can have different behavioral restrictions suitable for that type. For example, a playback duration restriction and a playback quantity restriction can be behavioral restrictions placed upon a video or music software object 234. In another example, a print restriction can be imposed on a photograph or document object 234. An object behavior engine 220 can enforce behavior restrictions for objects 234 as defined by the behavior tokens 236.

Identities of users 205 proximate to the computing device 210 can be one of the conditions that change which operations are permitted against one or more software objects 234. That is, authorized behavior can vary based upon an identity of a set of users 205 proximate to the computing device 210. User detector 214 can automatically detect users 205 proximate to device 210 and can fire user change events. User change events can indicate when new users 205 approach within a defined distance of device 210 and/or when users 205 previously within an interactive range of device 210, leave this range.

In one embodiment, a concept of a device usage state can be used to minimize complexities associated with behavior related actions that vary based upon user 205 proximities to device 210. In other words, behavior permitted against software objects 234 can depend upon which users 205 are accessing the software objects 234, upon whether software object 234 manipulations are being supervised by a responsible user 205, upon whether any unauthorized bystanders are able to observe the object 234 manipulations, and other definable factors. Illustrative device usage states can include an Owners Only State, an Administrator Only State, an Administrator and Consumer State, a Consumer Only State, an Intruder State, etc.

To elaborate, the Owners Only State can be a state when the only user(s) 205 proximate to device 210 own the object 234 being evaluated. The Administrator Only state can be a state where all users 205 proximate to device 210 have administrator privileges for the object 234 being evaluated. The Administrator and Consumer State can indicate that users 205 proximate to device 210 have at least consumer privileges and that one of the users 205 proximate to device 210 has at least administrator privileges. The Consumer Only State can indicate that all users 205 proximate to device 210 have consumer privileges. The Intruder State can indicate that one user 205 proximate to device 210 has no privileges for the object 234 being evaluated.

Different permissible behaviors for an object 234 can be specified by the behavior token 236 per device usage state. For example, when a graphic object 234 is used in an Owners Only State no restrictions may be applied. When the same graphic is used in an Administrator and Consumer State, a zoom restriction can be applied so that the graphic can only be zoomed to a defined level. In a Consumer Only State, zoom features for the graphic object can be disabled and the graphic object can only be displayed at a limited resolution. In an Intruder State, the graphic object may not be displayable. It should be emphasized that different objects 234 can be associated with different behavior tokens 236, which specify different behavioral restrictions.

Changing device usage states can be a dynamic process based upon user 205 proximity to device 210, which is performed by the user detector 214. Method 240 is a flow chart showing this dynamic process. Method 240 can include a step 242, where a check for changes to Surface users (users 205) can be conducted. When no change is users is detected, step 242 can repeat after a suitable delay or until an event associated with a possible change in user proximity occurs. When the users 205 proximate to device 210 change, an identity of the users 205 proximate to the device 210 can be determined, as shown by step 244. This step can involve comparing user specific characteristics, such as a user identifier entered into device 210 or a biometric captured by device 210, against a maintained data store of characteristics, which can be indexed against user permissions. User permissions can indicate a general usage category of a user, such as customer, sales representative, software developer, unknown, and the like. The usage category for a single user 205 can vary based upon usage context, such as which application 216 is being used, which software object 234 is being manipulated, and the like.

After a usage category is determined per proximate user 205, a set of configurable rules can be accessed, which determine a device usage state given the set of users 205 proximate to the device 210 and the general categories to which the users are associated. The device usage state can be changed in step 246 to reflect the current set of users 205 proximate to device 210. The method 240 can be a dynamic and constantly changing one, which is shown by the method looping from step 246 back to step 242, where another check for a change in proximate users can be made.

An asynchronous process 250 performed by object behavior engine 220 can adjust behavior settings of the objects 234 based at least in part upon a current device usage state. Method 250 can begin in step 252, where a programmatic event relating to a use of a software object 234 by an application 216 executing on device 210 can be detected. An identity of a user 205 who is attempting to use the object 234 can be determined, as shown by step 254. In step 256, a determination can be made from permissions specified within a related token 236 concerning which permissions are to be granted for the software object 234 given a current device usage state. In step 258, a usage request for the object 234 can be approved or denied based upon results of step 256. In step 260, suitable programmatic actions can be performed based upon the approval decision.

It should be appreciated that application 216, engine 220, and detector 214 can each include a set of software/firmware instructions stored in a machine readable medium which cause hardware components of device 210 to perform a set of actions, when the instruction code executes. Different, valid computer science techniques can be used by one of ordinary skill in the field to implement this hardware/software combination so long as an overall effect is achieved consistent with that described herein for application 216, engine 220, and detector 214.

For example, any number of different programming techniques can be used to implement the behavioral restrictions specified within the behavioral tokens 236 for the software objects 234. In one embodiment, application 216 code can be specifically modified to only allow those operations 218 permitted by the behavioral token 236. In another embodiment, software can intercept programmatic calls involving the software object 234, object approval actions involving engine 220 can be taken, and intercepted calls can be permitted or denied based upon approval results. Numerous call interception techniques exist that can be adapted for system 200, many of these techniques are used currently for tracking usage of in-place software without modifying that software.

Although the behavior tokens 236 are shown as being distinct from the software objects 234 this need not be the case. That is, in one contemplated embodiment, the behavior tokens 236 can be integrated within the software objects 234, such as meta data of the software objects 234 to which they relate. This meta data can keep track of properties such as: ownership, access rights for others, all behavioral capabilities (e.g., zoom in and out, copy, modify to be enabled/disabled/partially enabled, etc.) and object changes for different device usage states. The software tokens 236 can include data storage areas or fields, which are updated as system 200 is used. For example, when a software object 234 can have defined restrictions related to playback duration or quantity, updatable fields relating to playback duration or quantity can exist within the related token 236.

In one embodiment, a default set of behavioral tokens 236 can be established that define usage behavior restrictions for software objects 234. Object specific settings can override the default object behaviors. Additionally, different groups of software objects 234 can be optionally established, and behavior tokens 236 can be established that define group-level behavior. Any level of tiered behavioral groupings can be established, where more specific settings are able to override more generic settings.

Similarly, it is contemplated that even when device usages states are used to reduce complexities involving user 205 specific permissions, user 205 specific overrides can be established for system 200 that permit a finer grained control of object behavior that varies based upon a proximate set of users 205. Generally, system 200 illustrates a concept of object-level behavioral control within a surface based computing setting, which can vary based upon a set of proximate users 205. An arbitrary level and complexity of programmatic control can be imposed, so long as deterministic rules (optionally configurable) can define usage behavior restrictions and relationships between object behavioral rights and proximate sets of users 205.

Figure 3:
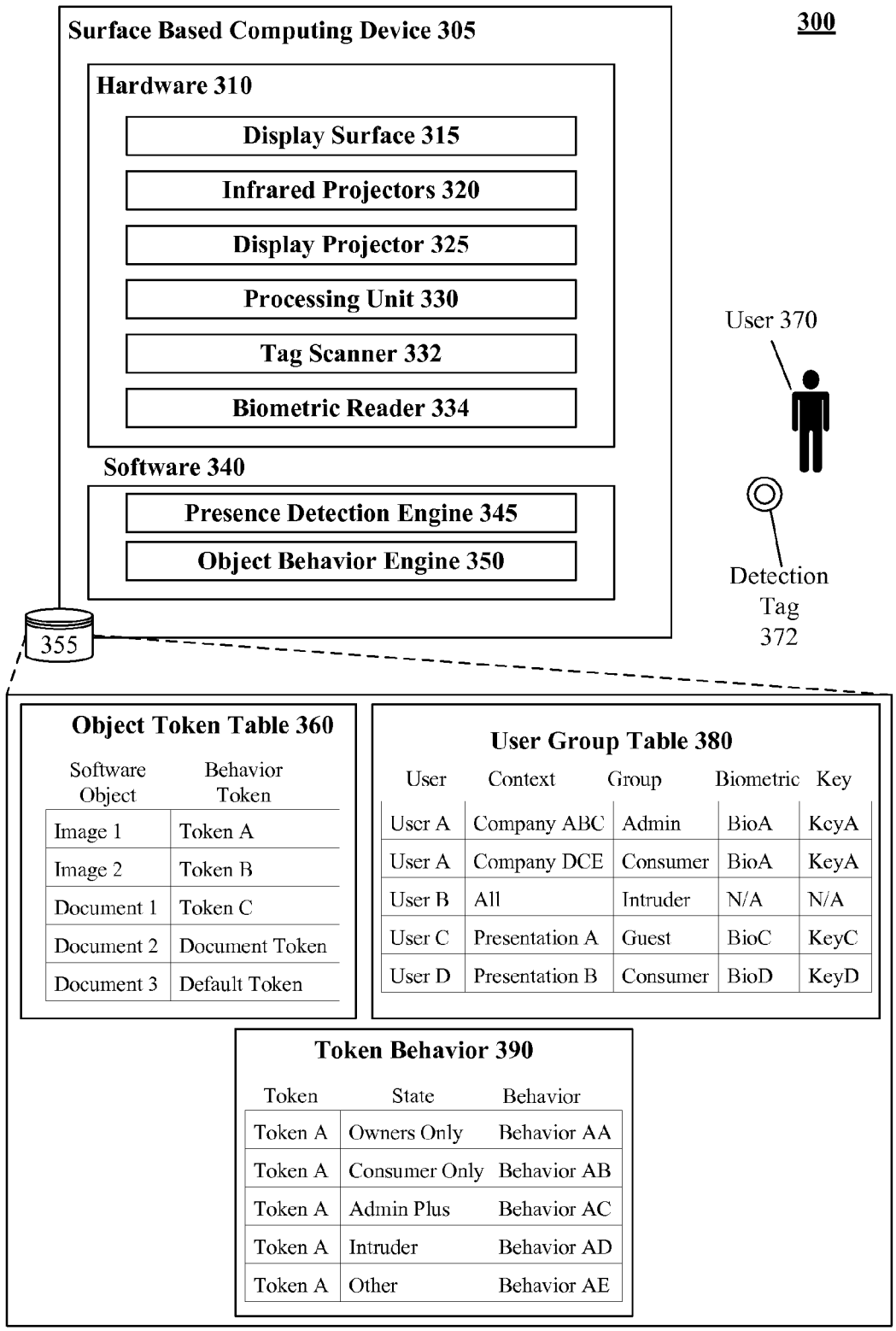
FIG. 3 is a schematic diagram of a surface based computing device having software object level permissions in accordance with an embodiment of the inventive arrangements disclosed herein.

FIG. 3 is a schematic diagram 300 of a surface based computing device 305 having software object level permissions in accordance with an embodiment of the inventive arrangements disclosed herein. The surface based computing device 305 can be an implementation instance of device 210.

The surface based computing device 305 can include hardware 310 and software 340. Hardware 310 can include the necessary components to create the functionality of a surface based computing device 305, such as a display surface 315, infrared projectors 320, display projector 325, processing unit 330, tag scanner 332, biometric reader 334, and/or other components.

The display surface 315 can be used with infrared projectors 320 to detect movements and objects placed upon the surface 315. The display projectors 325 can product visible images upon the display surface 315 for users 370 to view. The processing unit 330 can execute programmatic instructions 330 and can manage the other components 315, 320, 325, 332-334 of the device 305. Tag scanner 332 can read information from detection tags 327, which is one means for determining a presence and identity of users 370. The biometric reader 334 can capture a user characteristic (e.g., picture, finger print, iris scan, voice, etc.) that is processed to determine a user's identity.

Software 340 can include programmatic instructions executable by hardware 310 that permits the device 305 to function. Software 340 can include an object behavior engine 350, as described previously (engine 220). The presence detection engine 345 can be the software component for performing functions attributed to the user detector 214. More specifically, engine 345 can utilize a variety of presence detection software techniques and technologies to determine (from input provided via scanner 332, reader 334, and other detection hardware) a set of users 370 that are proximate to device 305.

In one embodiment, for example, users 370 can carry a detection tag 372, which is readable by scanner 332. For example, tag 372 can be a radio frequency identification (RFID) tag, a BLUETOOTH device, a WIFI transceiver, or other component that is able to convey digital information concerning the user 370 and the user's presence to device 305.

Digitally encoded content used by device 305 can be stored in a data store 355. For example, data store 355 can store software 340, can store software objects and behavior tokens, and can store rules for applying object-level security. As shown, an object token table 360 can record relationships between objects and behavioral tokens. One-to-one relationships can exist, as shown by Image 1 being associated with Token A, Image 2 being associated with Token B, and Document 1 being associated with Token C. A behavioral token can also apply to a group of software objects of a particular type, as shown by Document 2 being associated with a Document Token. When an object is not specifically associated with any behavioral token, a default token can be applied to the software object, as shown by Document 3 being associated with Default Token.

Data store 355 can also include a user group table 380. The table 380 can include a user identifier column, a context column, a permission group column, a biometric column, a security key column, and the like. Values in the biometric and security key columns can be compared against input obtained form the biometric reader 334 and scanner 332 to determine a user's identity. The same user can belong to different permission groups, depending upon an evaluation context. For example, in the context of a Company ABC software object, User A belongs to an Administrator group. In the context of a Company DEF object, User A can belong to a Consumer group.

A token behavior table 390 can also be stored in data sore 355, which can be used to associate tokens, device usage states, and object behaviors. Device usage states can be determined from the permission groups of users 370 detected near the device 305. A single token can permit different behaviors depending upon a current device usage context. As shown, Token A grants full behavioral permissions (Behavior AA) for a device usage state of Owners Only. Specifics of Token A for a Consumers Only State results in restrictions on image zoom, copy, and image resolution (Behavior AB).

As used herein data store 355 can be physically implemented within any type of hardware including, but not limited to, a magnetic disk, an optical disk, a semiconductor memory, a digitally encoded plastic memory, a holographic memory, or any other recording medium. Data store 355 can be stand-alone storage units as well as a storage unit formed from a plurality of physical devices, which may be remotely located from one another. Additionally, information can be stored within the data store 355 in a variety of manners. For example, information can be stored within a database structure or can be stored within one or more files of a file storage system, where each file may or may not be indexed for information searching purposes.

Figure 4:
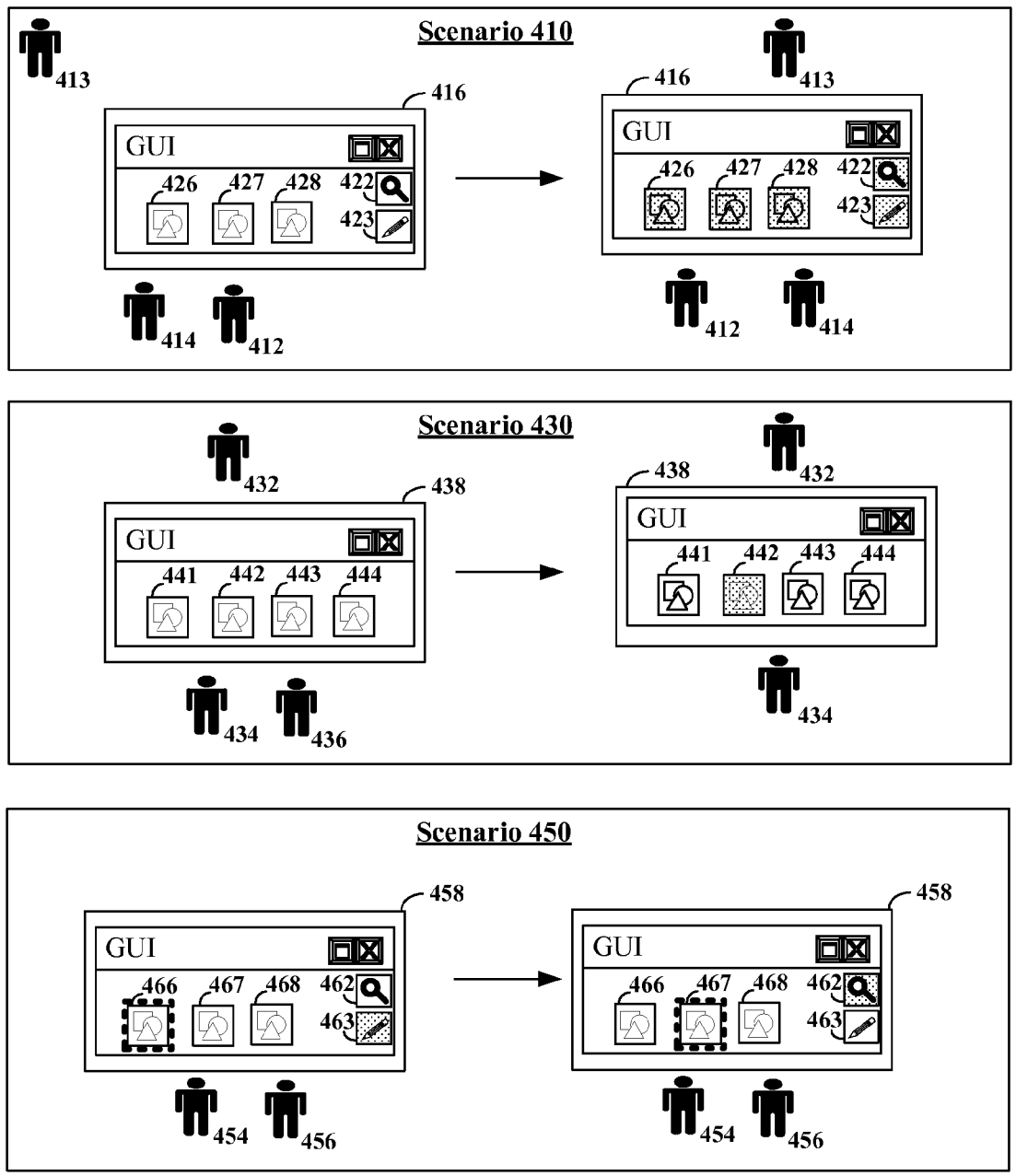
FIG. 4 illustrates a few scenarios for controlling software object behavior based in part upon a presence of users about a surface based computing device.

FIG. 4 illustrates a few scenarios 410, 430, and 450 for controlling software object behavior based in part upon a presence of users about a surface based computing device. The scenarios 410, 430, and 450 can occur in the context of a system 200.

In scenario 410, two users 412 and 414 can be interacting with software objects 426, 427, and 428 using surface based computing device 416. The users 412, 414 can both have administrator privileges against the software objects 426-428, which places the device 416 in an Administrator Only device usage state within which zooming 422 and editing 423 capabilities are enabled for the objects 426-428. A bystander 413, who lacks permissions to use objects 426-428, can approach the device 416. In response, the zooming 422 and editing 423 capabilities can be disabled and the software objects 426-428 can be hidden. These adjustments are made in accordance with details specified for the objects 426-428 by behavior tokens. Scenario 410 can represent a situation where sensitive information is presented within objects 426-428, which should be protected from observations of non approved individuals (e.g., user 413).

In scenario 430, three users 432, 434, and 436 can utilize objects 441-444 on surface based computing device 438. User 436 can be considered an administrator and users 432 and 434 can be considered consumers. When a device 438 is in an Administrator and Consumer usage state, access can be granted to all objects 441-444. Should the user 436 leave the area proximate to device 438, the usage state can change to a Consumer Only State. As shown, access can still be maintained for objects 441, 443-444 when in a Consumer Only State. Access to object 442 can be blocked or limited.

In scenario 450, two users 454 and 456 can use objects 466-468 on surface based computer device 458. Possible operations able to be performed against the objects 466-468 can include magnifying or zooming via control 462 and editing via control 463. Object 466 can initially have focus, which causes behavioral adjustments to be made on surface 458 for object 466. As shown, users 454 and 456 can be permitted to use the zoom control 462 but can be denied use of the edit control 463 for object 466 based upon privileges established by an associated behavior token. If the set of users 454, 456 proximate to device 458 were to change, permission for object 466 can change in a corresponding fashion.

Should a user 454, 456 select a different software object 467, behavioral adjustments can be made on surface based computing device 458 for that object 467 in accordance with a behavioral token associated with object 467. As shown, the zoom control 462 can be disabled for object 467, but the edit control 463 can be enabled. Again, changes to the set of users 454, 456 about the device 458 can affect usage permissions for objects 466-468. Thus, scenario 450 is provided to emphasize that behavioral controls for software objects 466-468 are applied at an object level and can vary from object to object.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for controlling behavior of software objects used on a surface based computing device comprising:
    associating software objects with behavior tokens, which control an extent that users are able to manipulate said software objects using a surface based computing device, wherein different manipulations of said software objects are based upon a set of a plurality of different users proximate to the surface based computing device;
    automatically detecting a presence of the set of a plurality of different users proximate to the surface based computing device, wherein each of the plurality of different users are concurrently interacting with software objects displayed on the surface based computing device;
    determining at least one of an identity and a privilege group for each detected user;
    computing a device state for the surface based computing device, wherein the device state determines a maximum privilege level for any of the users to manipulate any of the software objects on the surface based computing device, wherein three or more different device states exist, each granting different maximum privilege levels for manipulating the software objects, wherein changes in which of the plurality of different users are proximate to the surface based computing device automatically result in a corresponding change in the device state of the surface based computing device;
    receiving an attempt to perform an operation against one of the software objects using the surface based computing device;
    ascertaining a set of manipulation rights for the software object based upon details specified within a behavioral token associated with the software object and based upon a set of users proximate to the surface based computing device, wherein the behavior token defines the device state of the surface based computing device;
    applying said ascertained manipulation rights; and
    selectively permitting execution of operations associated with the received attempt in accordance with the applied rights.

2. The method of claim 1, wherein said behavior tokens are defined within metadata of the associated software objects, wherein a one-to-one correspondence exists between software objects and behavior tokens, and wherein manipulation rights are granted on a per-object basis.

3. The method of claim 1, wherein said privileges comprise configurable application level behavioral restrictions upon a use of the software object, wherein one of said application level behavioral restrictions defines restrictions on an amount of zoom that is able to be performed against an image software object by a user, wherein each of the plurality of different users has administrator privileges, said method further comprising:
    detecting an approach of a new user to a proximity of the surface based computing device;
    determining the new user has consumer privileges, which has lesser zoom privileges than those zoom privileges associated with administrators;
    changing the device state from an administrator state to an administrator and consumer state responsive to determining the new user has approached the proximity of the surface based computing device; and
    restricting zoom characteristics of the software objects to a lesser zoom magnitude while the device state of the surface based computer is in the consumer state.

4. The method of claim 1, further comprising:
    detecting a change to a set of users proximate to the surface based computing device;
    determining at least one of an identity and a privilege group for a user associated with the detected change; and
    dynamically altering a set of rights available for manipulating the software objects based upon the detected change.

5. The method of claim 1, wherein said different device states of the surface based computer comprise an Owners Only State, an Administrator Only State, an Administrator and Consumer State, a Consumer Only State, and an Intruder State, wherein the Owners Only State is a state where the different users proximate to the surface based computing device own the software objects displayed on the surface based computing device, wherein the Administrator Only State is a state where the different users proximate to the surface based computing device all have administrator privileges for at least a portion of the software objects displayed on the surface based computing device, wherein Administrator and Consumer State is a state where a portion of the different users proximate to the surface based computing device have administrator privileges and where a different portion of the different users have consumer privileges on the software objects, wherein the Consumer Only State is a state where the different users proximate to the surface based computing device all have consumer privileges on the software objects, and wherein the Intruder State is a state where the different users proximate to the surface based computing device comprise at least one user that has no privileges for at least one of the software objects.

6. A method for controlling software object behavior on a surface based computing device comprising:
    detecting a set of a plurality of users proximate to surface based computing device which displays a plurality of different software objects;
    determining privileges that each of the users of said set of users have for using each of the software objects via the surface based computing device, wherein each of the set of users have user specific privileges for using each of the software objects, which is defined by behavioral tokens associated with each of the software objects; and
    for each of the software objects, determining a device state specific to that software object that varies based on the plurality of users and their respective privileges for using that software objects, wherein three or more different device states exist, each granting different maximum privilege levels for manipulating the corresponding software objects, wherein changes in which of the plurality of different users are proximate to the surface based computing device automatically result in a corresponding changes in the device state of the surface based computing devices for the different software objects;

dynamically adjusting usages rules for the software objects in accordance with the determined privileges and in accordance with the device states determined for each of the software objects.

7. The method of claim 6, further comprising:

detecting a change to the set of users proximate to the surface based computing device; and repeating the determining and dynamically adjusting steps.

8. The method of claim 7, wherein said privileges are established on a per-object basis, wherein said privileges vary by a user attempting to use a software object, and wherein said privileges comprise a read, edit, delete, and copy privileges, wherein said privileges comprise configurable application level behavioral restrictions upon a use of the software object, wherein said privileges comprise configurable application level behavioral restrictions upon a use of the software object.

9. The method of claim 6, wherein said different device states of the surface based computer comprise an Owners Only State, an Administrator Only State, an Administrator and Consumer State, a Consumer Only State, and an Intruder State.

10. The method of claim 9, wherein the Owners Only State is a state where the different users proximate to the surface based computing device own the software objects displayed on the surface based computing device, wherein the Administrator Only State is a state where the different users proximate to the surface based computing device all have administrator privileges for at least a portion of the software objects displayed on the surface based computing device, wherein Administrator and Consumer State is a state where a portion of the different users proximate to the surface based computing device have administrator privileges and where a different portion of the different users have consumer privileges on the software objects, wherein the Consumer Only State is a state where the different users proximate to the surface based computing device all have consumer privileges on the software objects, and wherein the Intruder State is a state where the different users proximate to the surface based computing device comprise at least one user that has no privileges for at least one of the software objects.

11. The method of claim 8, wherein each software object is associated with at least one behavioral token, wherein said behavioral token controls what operations are able to be performed against the related software object, wherein the controlled operations vary depending upon the set of users proximate to the surface based computing device.

12. The method of claim 11, wherein controlled operations include applying restrictions to application level interactions with the software objects.

13. The method of claim 12, wherein said applied restrictions comprise a restriction of a level of zoom that is able to be applied to an image software object.

14. The method of claim 6, wherein said different device states of the surface based computer comprise an Administrator Only State, a Consumer Only State, and an Intruder State, wherein the Administrator Only State is a state where the different users proximate to the surface based computing device all have administrator privileges for at least a portion of the software objects displayed on the surface based computing device, wherein the Consumer Only State is a state where the different users proximate to the surface based computing device all have consumer privileges on the software objects, and wherein the Intruder State is a state where the different users proximate to the surface based computing device comprise at least one user that has no privileges for at least one of the software objects.

15. A system for object level security on a surface based computing device comprising:

a set of one or more software objects stored on a machine readable medium accessible by a surface based computing device;

a set of one or more behavior tokens stored on a machine readable medium accessible by a surface based computing device, wherein said behavior tokens control an extent that users are able to manipulate said software objects using said surface based computing device, wherein different levels of control are established on an object-by-object basis for different users, wherein the extent users are able to manipulate said software objects depends upon set of a plurality of different users proximate to the surface based computing device, which is referred to as a device state of the surface based computing device, wherein device states of the surface based computer comprise at least three of an Owners Only State, an Administrator Only State, an Administrator and Consumer State, a Consumer Only State, and an Intruder State, wherein the system granting different maximum privilege levels for manipulating the software objects in accordance with the device state of the surface based computing device, wherein changes in which of the plurality of different users that are proximate to the surface based computing device automatically result in the surface based computing device effectuating a corresponding change in the device state of the surface based computing device.

16. The system of claim 15, further comprising:

a presence detector configured to detect individuals proximate to said surface based computing device and configured to determine an identity of a user attempting to manipulate one of the software objects, wherein user identities determined by said presence detector are matched against user identities specified within the behavior tokens and are used to control manipulations of said software objects via the surface based computing device.

17. The system of claim 16, wherein at least one of said security tokens retract manipulation privileges otherwise granted against at least one of the software objects based upon a presence of an unauthorized user, as determined by the presence detector.

18. The system of claim 16, wherein at least one of the behavior tokens grant manipulation privileges otherwise unavailable for at least one of the software objects based upon a presence of an authorizing user, as determined by the presence detector.

19. The system of claim 16 wherein a behavior token must be associated with each software object before said software object is able to be manipulated by the surface based computing device by surface based computing device users.

20. The system of claim 15, wherein said software objects comprise a plurality of software objects, wherein said behavior tokens comprise a plurality of behavior tokens, and wherein a one-to-one relationship exists between the software objects and the behavior tokens.

* * * * *